Figure 1:
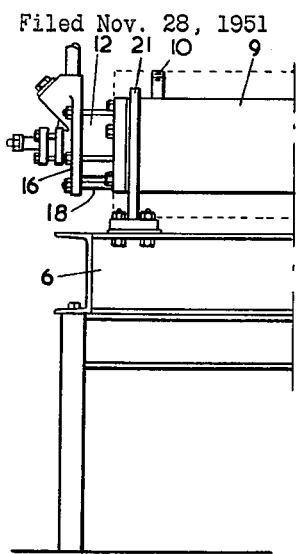

March 27, 1956 — H. BATES ET AL — 2,739,879
PRESSURE REACTOR
Filed Nov. 28, 1951 — 2 Sheets-Sheet 2

H. BATES
J. W. FISHER
E. J. UPTON
INVENTORS

ATTORNEYS

United States Patent Office 2,739,879
Patented Mar. 27, 1956

2,739,879

PRESSURE REACTOR

Harold Bates, James Wotherspoon Fisher, and Edward James Upton, Spondon, near Derby, England, assignors to British Celanese Limited, a corporation of Great Britain Application November 28, 1951, Serial No. 258,731

Claims priority, application Great Britain December 6, 1950

10 Claims. (Cl. 23—285)

This invention relates to the treatment of flowable materials and particularly to a method and apparatus for carrying out such a treatment, and especially a chemical reaction, as a continuous process.

According to the present invention a method of carrying out a treatment of a flowable material as a continuous process comprises passing the material through a series of communicating chambers of which each successive pair is of constant aggregate volume, increasing substantially up to that volume the volume of the leading chamber and the following chamber alternately of each pair simultaneously, and supplying fresh material to the rearmost chamber of the series while the volume thereof is increasing, at a rate substantially equal to the rate of increase of the volume thereof. It is usually desirable that the constant aggregate volumes of the successive pairs of chambers should all be equal but, when the treatment is one involving a substantial change of volume of the material, the aggregate volumes may be made successively larger or smaller to compensate for this change. By the method described above, each time the volume of the first chamber increases from zero to the maximum, a portion of the material enters the chamber, and that portion then passes through the series of chambers as a unit, substantially unmixed with the material previously or subsequently supplied, so that it has a definite time of residence in the series of chambers. At the same time, during each transfer from one chamber to the next, the material within that portion is thoroughly mixed by the act of transferring it so that a high degree of uniformity and homogeneity of the material is ensured. In addition to the method defined above the invention contemplates, as a piece of apparatus, a treatment vessel and associated elements for carrying out that method.

The apparatus according to the present invention comprises a series of cylinders communicating with one another end to end, a piston in each cylinder formed with a passage through its thickness, and a common piston rod on which all said pistons are mounted, the length of each cylinder exclusive of the thickness of the piston therein being equal. The series of cylinders is most conveniently formed by dividing a long tube by means of partitions which thus serve as the end walls of the individual cylinders. Each cylinder constitutes a pair of chambers whose aggregate volume is constant, the chambers of each pair being separated from one another by the piston, whose motion from end to end of the cylinder increases the volume of the leading chamber and the following chamber alternately substantially up to that aggregate volume, the other chamber meanwhile being diminished in volume substantially to zero. By reciprocating the piston rod over a distance equal to the length of each cylinder (exclusive of the thickness of the piston) the leading chambers and the following chambers of all the cylinders simultaneously can be alternately increased and diminished in this manner and, by irreversibly supplying fresh material to the rearmost chamber, the material is forced through the treatment vessel from one end of the series of cylinders to the other.

For the purpose of irreversibly supplying fresh material to the rearmost chamber, the entry passage to the first cylinder and the passage through the first piston (or indeed the passage through any one or more of the cylinder end walls and through any one or more of the pistons) may each be provided with a non-return valve to give a pumping effect whereby the material supplied to the first cylinder is drawn into the rearmost chamber each time the volume thereof increases.

The valves may be such as to be automatically actuated by pressure differences in the material on the two sides thereof, or they may, if desired, be positively actuated by mechanical means in accordance with the direction of travel of the piston rod. Instead of providing valves in the structure of the vessel itself, moreover, a separate pump may be provided, actuated in timed relationship with the piston rod, to supply the required fresh material to the first chamber.

By making the edges of the pistons fit closely to the cylinder walls, and by making each of the cylinder end walls or partitions fit closely to the piston rod, the cylinder walls and the piston rod can be regularly cleared of the material by a scraping action, so that stagnation of small quantities of material within the treatment vessel is avoided. It is desirable that the communicating passages through the pistons and between the cylinders should be spaced both from the cylinder wall and from the piston rod.

As indicated above, the method and apparatus of the present invention are of particular importance in the carrying out of chemical reactions in flowable materials. Examples of reactions that are commonly carried out as batch processes and which the present invention enables to be carried out as continuous processes are the reactions involved in the esterification of cellulose and the ripening and stabilising of the esterified material for the production of cellulose acetate or other esters of cellulose. The invention is advantageous, however, in the carrying out as a continuous process of any other reactions in flowable materials (e. g. solutions, suspensions, emulsions or slurries) in which uniformity in the duration or other conditions of the reaction is an important consideration. The invention may also be used for carrying out other treatments of flowable materials, e. g. the homogeneising or attemperating of mixtures, or the heating or cooling of the materials to a uniform temperature while avoiding excessive local variation in temperature.

Figure 2:
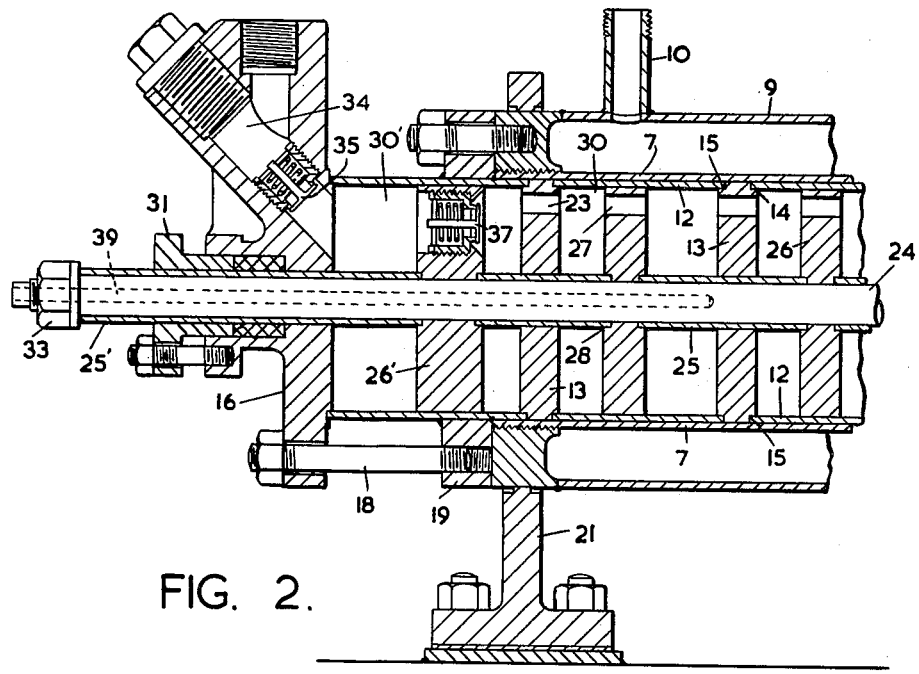
Figure 3:
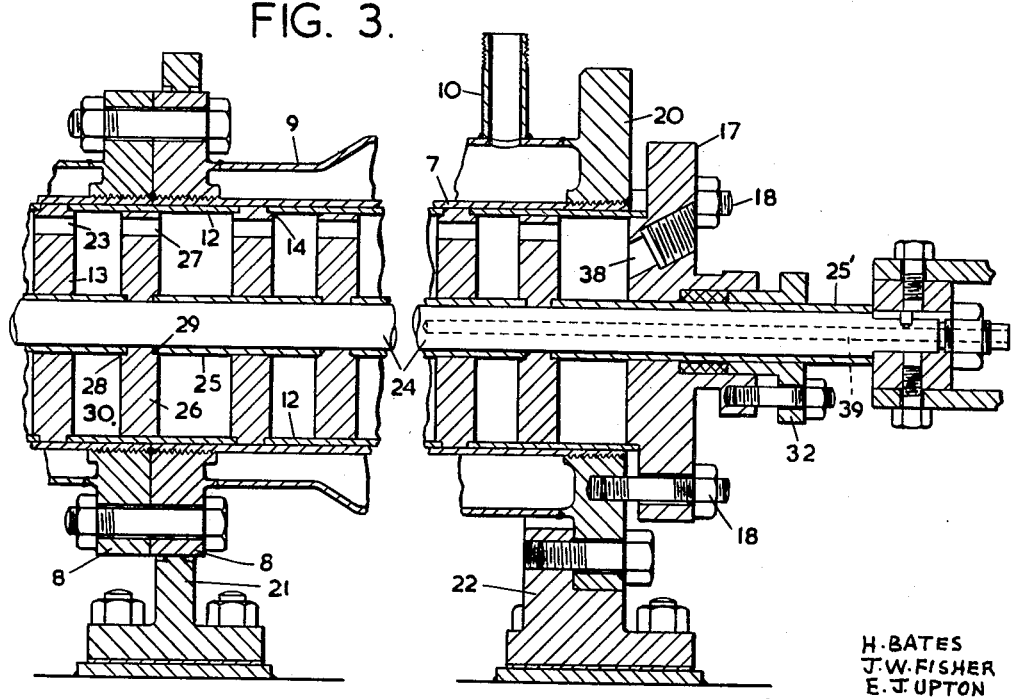

By way of example one form of apparatus in accordance with the present invention, suitable for the carrying out of a chemical reaction under controlled temperature conditions, will now be described in greater detail with reference to the accompanying drawings in which:

Figure 1 is a side elevation (broken into two parts) of the apparatus as a whole, Figures 2 and 3 are sections on an enlarged scale of the inlet and outlet ends of the reaction vessel, Figure 4 is an enlarged part-sectional side elevation of the reversing valve assembly of the apparatus of Figure 1, and Figure 5 is a sectional plan of a detail of Figure 4.

The apparatus described is a relatively small one, of pilot-plant scale, having a total capacity of about 10 litres, though the design is readily adaptable to give a reaction vessel of much greater capacity. The vessel comprises a frame 6 on which is mounted a continuous tube 7 of about 6′ 6″ in length and 4¼″ internal diameter. The tube is formed in three sections, bolted together by means of end flanges 8, and each section is separately jacketed by a jacket 9 of about 7″ diameter provided with inlet and outlet pipes 10 for the flow of heating or cooling medium.

The jackets 9 are covered with lagging, omitted for clarity but indicated by dotted lines at 11.

As shown in Figures 2 and 3, the tube 7 is lined with a stainless steel liner divided into 4" lengths 12, between which are clamped phosphor bronze discs 13 about ¾" in thickness. The edges of the discs 13 are recessed or rabbeted on each face at 14 to receive the ends of the liner sections 12, the inner edges 15 of which are slightly bevelled. End plates 16, 17 on each end of the cylinder engage the end sections of liner 12 and are drawn up by clamping bolts 18 towards the end flanges 19, 20 of the tube 7 so as to clamp the discs 13 in position by means of the liners 12. As shown in Figure 3, the apparatus is arranged so that each joint between abutting end flanges 8 is overlapped by one of the liner sections 12. The tube 7 is carried in bearers 21, 22 mounted across the frame 6, and supporting the end flanges 19, 20 and each pair of flanges 8, the end flange 20 being anchored longitudinally to the end bearer 22.

A passage 23 of about 0.4" bore extends through the thickness of each disc 13 near the upper edge thereof. Each disc 13 is centrally bored with a 1" hole, a piston rod 24 extending through the whole length of the tube 7 and through the end plates 16, 17 thereof. The piston rod 24 is covered with 4" lengths 25 of stainless steel jacketing, 1" in external diameter, to fit the central holes in the discs 13. Between each length 25 of jacketing and the next is clamped a phosphor bronze piston 26 of about ¾" thickness having a passage 27 of 0.4" bore near its edge, the central bore of each piston being recessed on each face at 28 to receive the ends of the stainless steel jacket section 25, the outer edges of which are slightly bevelled at 29. One piston 26 is thus secured to the piston rod 24 in each of the succession of cylinders 30 into which the tube 7 is divided by the discs 13 described above. The end sections 25' of stainless steel jacketing are of greater length than the sections 25 and extend through packed glands 31, 32 in the end plates 16, 17 of the tube 7, a nut 33 on one end of the piston rod 24 engaging with the corresponding end section 25' of jacketing so as to clamp the pistons 26 in position on the piston rod 24.

The end plate 16 at the inlet end of the tube 7 is bored with an inlet passage 34 containing a spring-loaded non-return valve 35. The piston 26' nearest to the inlet end of the tube is of greater thickness than the other pistons 26 and also contains a spring-loaded non-return valve 37, the cylinder 30' in which the piston 26' is contained being of greater length than the other cylinders 30 so as to compensate for the greater thickness of the piston 26'. The cylinder 30', the piston 26' contained therein and the two non-return valves 35, 37, together constitute a pump for forcing reaction material supplied to the inlet 34 through the tube 7 to the other end thereof and through an outlet passage 38 in the end plate 17. The piston rod 24 may be bored at either or both of its ends as at 39, to form pockets for the reception of thermocouplers or other devices.

At the end of the piston rod 24 opposite to the clamping nut 33 the piston rod is coupled to the piston rod 41 of a hydraulic cylinder 42 mounted in brackets 43 on the frame 6. The two ends of the cylinder 42 are connected by pipes 44 to a valve assembly 45 mounted at the end of the frame 6. Beneath the valve assembly 45 as shown in Figure 4, is carried a gear pump 46 adapted to supply an actuating liquid under pressure to the pipes 44 alternately. The pump 46 is driven at constant speed and designed to give a constant volumetric rate of delivery of actuating liquid so that the piston rod 24 is reciprocated at a substantially uniform rate in each direction. The valve assembly 45 is such as to connect one end of the cylinder 42 to the inlet 47 of the pump 46 and the other to the outlet 48 and, on being moved to reverse these connections.

For this purpose the valve assembly 45 comprises a pair of pistons 51 on a common valve stem 52, working in a valve cylinder 53 formed through a block 54 and closed by end-plates 55 through which the stem 52 passes. Grooves 56 formed in the ends of the block 54 and covered by the plates 55 constitute an outlet at each end of the cylinder 53, communicating by a passage 57 with the inlet 47 of the pump 46. A vertical inlet 58 entering the valve cylinder mid-way along its length communicates with the pump outlet 48 and two lateral passages 59 communicate with the pipes 44 leading to the two ends of the hydraulic cylinder 42. Opposite the inlet 58 is a vertical bore 60 containing a piston 61 heavily loaded by a spring 62 against the pressure of the fluid in the valve cylinder 53. An oil reservoir 63, connected at 64 (Figure 5) to the cross-passage 57 and so to the inlet 47 of the pump 46, keeps the system filled with actuating fluid.

A frame 65 secured to one end of the valve stem 52 carries two collars 66 which slidably encircle an extension 67 of the piston rod 41. Between the collars 66 and a collar 68 fixed to the extension 67 lie two compression springs 69. A pair of pivoted catches 70 loaded by springs 71 are provided, to engage one or other of the slidable collars 66 and to hold the collars 66, frame 65 and valve stem 52 in one or other of their operative positions. The free inner ends 72 of the catches 70 both lie in the way of a yoke 73 connected to the spring-loaded piston 61 and adapted, when the piston 61 is moved by the fluid pressure, to lift the catches 70 and release the slidable collar 66 held by one of them. By these means when the hydraulic piston rod 41 reaches the end of its stroke and the pressure on the outlet side 48 of the pump 46 rises sharply, the operative catch 70 is released and the compression spring 69, loaded by the motion of the piston rod 41 and extension 67, forces the collars 66, frame 65 and valve stem 52 to their other position, where they are held by the other catch 70 engaging the other slidable collar 66. The connections effected by the valve assembly 45 are thus reversed, and the piston rods 41 and 24 are then driven in the opposite direction.

In the operation of the whole device, the reaction materials are supplied to the inlet 34 of the device as a well stirred and attemperated mixture. Assuming the reaction vessel constituted by the tube 7 to be filled with the reaction mixture, when the piston rod 24 moves in the direction from the inlet end 16 of the device towards the outlet end 17, the liquid in each of the series of cylinders 30, 30' is forced through the apertures 23 in the discs 13 between the cylinders 30 from one cylinder to the next, the motive power being derived from the rearmost piston 26', the valve 37 in which is closed. At the same time, fresh material is drawn into the rearmost cylinder 30' through the inlet valve 35, which is open, and completely reacted material is forced out of the leading cylinder through the outlet 38. There is no substantial transfer of liquid through the aperture 27 in any of the pistons since the space behind each piston 26 is kept filled with liquid forced in from the cylinder 30 on the inlet side thereof.

When the piston rod 24 reaches the end of its forward stroke and substantially all the reacting material has been squeezed from the behind each disc 13 through the aperture 23 therein, a strong resistance to further motion is set up, and the pressure on the outlet side 48 of the gear pump 46 rises sharply. This causes the hydraulic valve assembly 45 controlling the flow of fluid between the pump 46 and cylinder 42 to be moved in the manner described above, so that the fluid is supplied to the other end of the hydraulic cylinder 42 and the motion of the piston rods 41, 24 is reversed. During the reverse motion the valve 35 at the inlet end of the tube 7 is closed and the liquid in the rearmost cylinder 30' is forced through the valve 37 in the piston 26' contained in that cylinder. At the same time the liquid in each one of the series of cylinders 30 is forced through the aperture 27 in the piston contained in that cylinder. There is no transfer of liquid from one cylinder 30 to another since each cylinder is full of liquid. On reaching the end of the reverse stroke the pressure again rises on the outlet side 48 of the gear pump 46 and the direction of motion of the piston rods 41, 24 is again reversed.

Having described our invention, what we desire to secure by Letters Patent is:

1. Apparatus for the treatment of a flowable material, said apparatus comprising a plurality of cylinders communicating with one another end to end in series, the cylinder at one end of said series having an inlet passage for said series and the cylinder at the other end of said series having an exit passage for said series, non-return valve means to prevent flow of material through said series from the outlet to the inlet end thereof, a piston in each cylinder formed with a passage through thickness of said piston, and a common piston rod on which all said pistons are mounted, the lengths of said cylinders exclusive of the thicknesses of the respective pistons therein being substantially equal.

2. Apparatus according to claim 1 comprising a long tube divided into a series of cylinders by partitions each formed with a passage through its thickness.

3. Apparatus according to claim 1 comprising, as the non-return valve means, a non-return valve in one of the end walls of the series of cylinders, and a non-return valve in the passage through one of the pistons.

4. Apparatus according to claim 3 wherein the non-return valves are provided in the entry passage to the first cylinder and in the passage through the first piston.

5. Apparatus according to claim 1 comprising means for reciprocating the piston rod with a substantially uniform linear velocity in each direction.

6. Apparatus according to claim 5 comprising a hydraulic cylinder, a piston therein connected with the piston rod of the apparatus, a pump of constant delivery rate for supplying actuating liquid to said hydraulic cylinder, and a valve assembly for switching the supply of actuating liquid from one end of said hydraulic cylinder to the other.

7. Apparatus according to claim 6 comprising a valve assembly adapted to be actuated by a rise in pressure in the delivery side of the pump.

8. Apparatus according to claim 1 comprising jackets for heating or cooling liquids surrounding each of the cylinders.

9. Apparatus for the treatment of a flowable material, said apparatus comprising a long tube divided into a series of cylinders by partitions each formed with a passage through the thickness of said partition, a piston in each of said cylinders formed with a passage through the thickness of said piston, a common piston rod passing slidably through said apparatus and having all said pistons mounted thereon, a non-return valve in the entry passage to the first cylinder, and a non-return valve in the passage through the first piston, the lengths of said cylinders exclusive of the thicknesses of the respective pistons therein being substantially equal.

10. Apparatus for the treatment of a flowable material, said apparatus comprising a long tube divided into a series of cylinders by partitions each formed with a passage through the thickness of said partition, jackets for heating or cooling liquid surrounding each of said cylinders, a piston in each of said cylinders formed with a passage through the thickness of said piston, a common piston rod passing slidably through said apparatus and having all said pistons mounted thereon, a non-return valve in the entry passage to the first cylinder, a non-return valve in the passage through the first piston, the lengths of said cylinders exclusive of the thicknesses of the respective pistons therein being substantially equal, a hydraulic cylinder separate from said series of cylinders, a piston in said hydraulic cylinder connected with said piston rod, a pump of constant delivery rate for supplying actuating liquid to said hydraulic cylinder, and a valve assembly adapted to be actuated by a rise in pressure in the delivery side of said pump and to switch the supply of actuating liquid from one end of said hydraulic cylinder to the other.

References Cited in the file of this patent

UNITED STATES PATENTS

| 960,045 | Shapiro | May 31, 1910 |
| 1,408,092 | Keller | Feb. 28, 1922 |
| 2,470,191 | Seymour et al. | May 17, 1949 |
| 2,491,618 | Luetzelschwab | Dec. 20, 1949 |
| 2,498,773 | Thompson | Feb. 28, 1950 |
| 2,520,424 | Mills et al. | Aug. 28, 1950 |

FOREIGN PATENTS

| 1,229 | Austria | Mar. 30, 1926 |